(12) United States Patent
Nimmagadda et al.

(10) Patent No.: US 10,547,644 B2
(45) Date of Patent: Jan. 28, 2020

(54) ENFORCING MICRO-SEGMENTATION POLICIES FOR PHYSICAL AND VIRTUAL APPLICATION COMPONENTS IN DATA CENTERS

(71) Applicant: Juniper Networks, Inc., Sunnyvale, CA (US)

(72) Inventors: Srinivas Nimmagadda, San Jose, CA (US); Rakesh Kumar, San Ramon, CA (US); Prakash T. Seshadri, Fremont, CA (US); Sriram Subramanian, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 272 days.

(21) Appl. No.: 15/639,366

(22) Filed: Jun. 30, 2017

(65) Prior Publication Data
US 2019/0007456 A1   Jan. 3, 2019

(51) Int. Cl.
*H04L 29/06* (2006.01)

(52) U.S. Cl.
CPC .......... *H04L 63/20* (2013.01); *H04L 63/0263* (2013.01); *H04L 63/0272* (2013.01)

(58) Field of Classification Search
None
See application file for complete search history.

(56) References Cited

U.S. PATENT DOCUMENTS

| 9,438,634 | B1 | 9/2016 | Ross et al. | |
|---|---|---|---|---|
| 9,560,081 | B1 * | 1/2017 | Woolward | H04L 63/20 |
| 2009/0249438 | A1 * | 10/2009 | Litvin | H04L 63/0263 726/1 |
| 2016/0191463 | A1 | 6/2016 | Mohanty et al. | |
| 2016/0269425 | A1 | 9/2016 | Shieh et al. | |
| 2017/0339188 | A1 * | 11/2017 | Jain | H04L 63/0428 |

OTHER PUBLICATIONS

Extended European Search Report corresponding to EP 18175060.5 dated Nov. 6, 2018, 13 pages.

* cited by examiner

*Primary Examiner* — Fatoumata Traore
(74) *Attorney, Agent, or Firm* — Harrity & Harrity, LLP (57) ABSTRACT

A device may receive policy information associated with a first application group and a second application group. The device may receive network topology information associated with a network. The device may generate a first policy based on the policy information and the network topology information, and generate a second policy based on the policy information and the network topology information. The device may provide, to the virtual network device, information associated with the first policy to permit the virtual network device to implement the first policy in association with network traffic transferred between the first application group and the second application group. The device may provide, to the physical network device, information associated with the second policy to permit the physical network device to implement the second policy in association with network traffic transferred between the first application group and the second application group.

20 Claims, 7 Drawing Sheets

ENFORCING MICRO-SEGMENTATION POLICIES FOR PHYSICAL AND VIRTUAL APPLICATION COMPONENTS IN DATA CENTERS

BACKGROUND

Micro-segmentation refers to enforcing security controls, such as firewalls, intrusion prevention systems, access control lists, etc., in a more granular manner than as compared to enforcing perimeter-based security controls. In micro-segmentation scenarios, a hypervisor, a cloud platform, and/or the like can implement security controls in association with application components that are running as virtual machines.

SUMMARY

According to some possible implementations, a device may include one or more processors to receive policy information associated with a first application group and a second application group, the first application group including a first set of virtual application components, the first application group including a first set of physical application components, the second application group including a second set of virtual application components, and the second application group including a second set of physical application components; receive network topology information associated with a network; generate a first policy, to be provided to a virtual network device of the network, based on the policy information and the network topology information, a virtual application component, of the first set of virtual application components, being connected to the virtual network device; generate a second policy, to be provided to a physical network device of the network, based on the policy information and the network topology information, a physical application component, of the first set of physical application components, being connected to the physical network device; provide, to the virtual network device of the network, information associated with the first policy to permit the virtual network device to implement the first policy in association with network traffic transferred between the virtual application component, of the first set of virtual application components, and the second set of virtual application components; and provide, to the physical network device, information associated with the second policy to permit the physical network device to implement the second policy in association with network traffic transferred between the physical application component, of the first set of physical application components, and another physical application component of the second set of physical application components.

According to some possible implementations, a non-transitory computer-readable medium may store one or more instructions that, when executed by one or more processors, cause the one or more processors to receive policy information associated with a first application group and a second application group; receive network topology information associated with a network; generate a first policy, to be provided to a virtual network device of the network, based on the policy information and the network topology information; generate a second policy, to be provided to a physical network device of the network, based on the policy information and the network topology information, the first policy being different than the second policy; provide, to the virtual network device, information associated with the first policy to permit the virtual network device to implement the first policy in association with network traffic transferred between the first application group and the second application group; and provide, to the physical network device, information associated with the second policy to permit the physical network device to implement the second policy in association with network traffic transferred between the first application group and the second application group.

According to some possible implementations, a method may include receiving, by a device, policy information associated with a set of application groups; receiving, by the device, network topology information associated with a network; generating, by the device, a first policy, to be provided to a set of virtual network devices of the network, based on the policy information and the network topology information; generating, by the device, a second policy, to be provided to a set of physical network devices of the network, based on the policy information and the network topology information; providing, by the device and to a virtual network device of the set of virtual network devices, information associated with the first policy to permit the virtual network device to implement the first policy in association with network traffic transferred between the set of application groups; and providing, by the device and to a physical network device of the set of physical network devices, information associated with the second policy to permit the physical network device to implement the second policy in association with network traffic transferred between the set of application groups, the second policy including a set of rules associated with a set of physical application components of the set of application groups, and the second policy not including another set of rules associated with a set of virtual application components of the set of application groups.

DETAILED DESCRIPTION

The following detailed description of example implementations refers to the accompanying drawings. The same reference numbers in different drawings may identify the same or similar elements.

In a perimeter-oriented security deployment, a data center can implement security controls (e.g., firewalls, intrusion prevention systems, and/or the like) at a perimeter of the data center to process ingress and egress network traffic to identify security risks (e.g., malware, viruses, Trojan horses, spyware, ransomware, etc.). However, lateral attacks between internal applications of the data center can render the entire data center vulnerable in perimeter-oriented security deployments. For example, the entire data center might be vulnerable in situations where an internal application is compromised. Additionally, policies and associated rule sets might become expansive in perimeter-oriented security deployments, thereby increasing difficulty of policy management for network operators, increasing consumption of network device computing resources, increasing network resource consumption, and/or the like.

In association with virtualized computing environments, micro-segmentation alleviates some of these security issues by implementing security controls closer to data center applications than as compared to perimeter-oriented security deployments. For example, micro-segmentation permits individual application components (e.g., web servers, application servers, database servers, and/or the like) of an application (e.g., a web application, an email application, a gaming application, a social media application, etc.) to implement respective security perimeters. For example, a hypervisor kernel, of a computing device, can implement security controls for virtualized application components that are running as virtual machines (e.g., virtualized servers, a cloud platform, and/or the like).

In some situations, legacy applications, performance-oriented applications (e.g., databases), and/or the like, may run as bare-metal applications that are connected to physical ports of data center network devices (e.g., routers, switches, gateways, etc.). While hypervisor-implemented security controls can permit micro-segmentation and increase security of data center applications, physical application components (e.g., bare-metal applications) might still be vulnerable to security risks that are transmitted internally throughout the data center. For example, network traffic transferred between physical application components might not traverse hypervisor-implemented security controls. As such, the efficacy of micro-segmentation might be compromised in situations where a data center includes both virtual application components and physical application components.

Some implementations described herein provide enforcement of micro-segmentation policies for network traffic transferred between virtual application components and for network traffic transferred between physical application components. Some implementations described herein provide a security platform that may receive policy information associated with an application group (e.g., a set of application components), and receive network topology information that identifies whether the respective application components are virtual or physical application components and/or whether the respective application components are connected to virtual network devices or physical network devices. Additionally, some implementations described herein permit the security platform to generate custom policies that are to be provided to virtual network devices or physical network devices, such that the virtual network devices and the physical network devices can implement the custom policies in association with network traffic transferred between application components of the application group and other application groups.

In this way, some implementations described permit a policy to be implemented in association with network traffic that is transferred between virtual application components of application groups, and permit the policy to be implemented in association with network traffic that is transferred between physical application components of application groups. Additionally, and as described elsewhere herein, some implementations described herein permit physical network devices to store a reduced number of rules as compared to situations where the physical network devices are to store an entire set of rules associated with a policy. In this way, some implementations described herein conserve processor and/or memory resources of physical network devices, improve security of data centers, improve resource utilization of data centers, permit micro-segmentations without requiring network re-engineering, and/or the like.

Figure 1A:
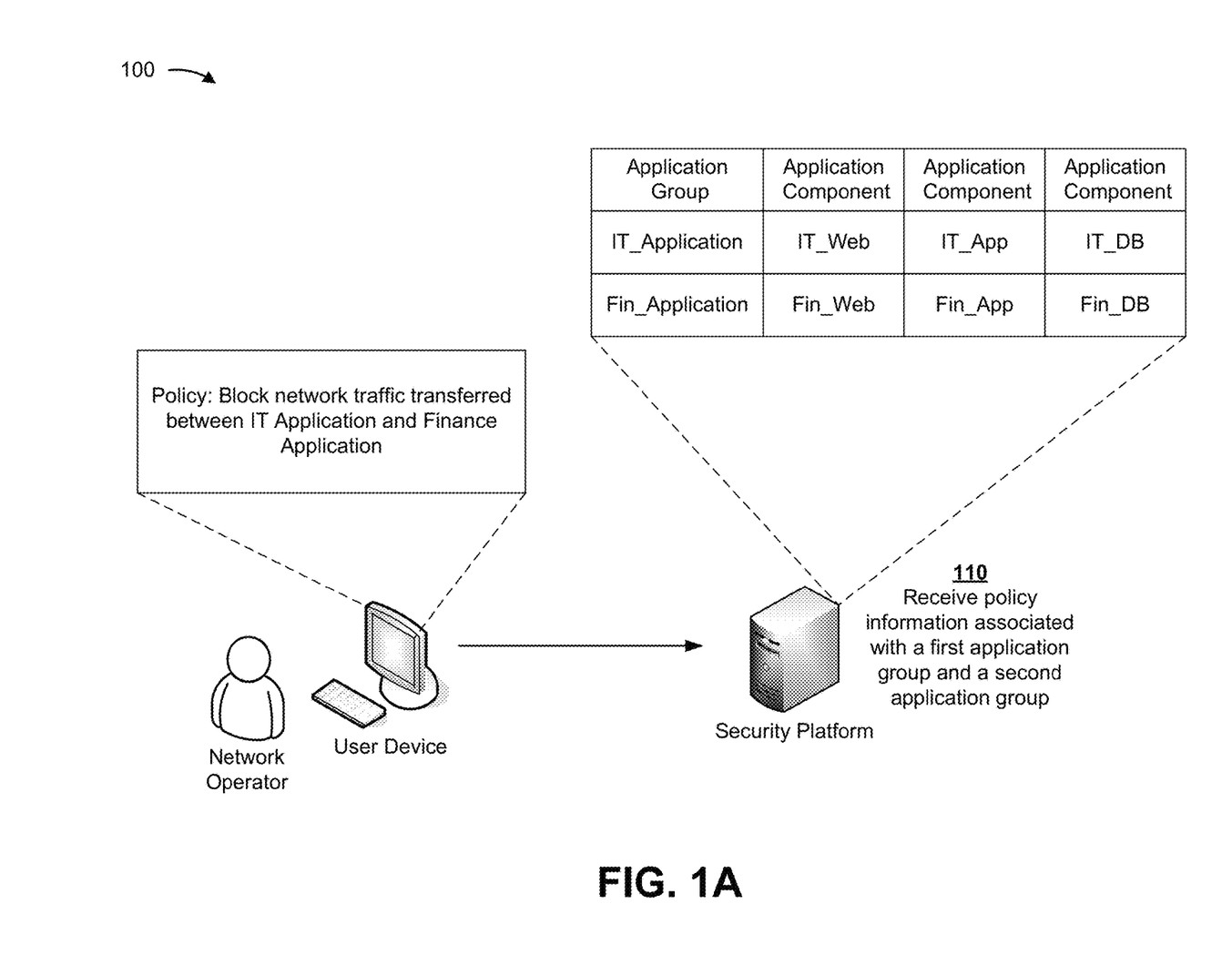
FIGS. 1A-1D are diagrams of an overview of an example implementation described herein.

FIGS. 1A-1D are diagrams of an overview of an example implementation 100 described herein. As shown in FIG. 1A, and by reference number 110, a security platform may receive policy information associated with a first application group and a second application group. An application group may include a set of application components that perform a functionality associated with an application. For example, as shown, a financial application group (Fin_Application) may include a web server (Fin_Web), an application server (Fin_App), and a database server (Fin_DB). Additionally, as shown, an information technology (IT) application (IT_Application) may include a web server (IT_Web), an application server (IT_App), and a database server (IT_DB). As an example, assume that the application components are located within a same data center, and that a network operator desires to enforce a policy that restricts the applications from communicating.

The policy information may refer to a set of rules that is to be applied to network traffic transferred between application components of the financial application and the IT application. For example, as shown, the network operator may interact with a user device to configure a policy that identifies that network traffic that is transferred between application components of the IT application and the finance application is to be blocked.

The policy information may identify the respective sets of application components of the respective application groups. For example, the policy information may include a set of network addresses that identifies the respective sets of application components. As shown, the security platform may use the policy information to identify the application components. In this way, the security platform may generate custom policies based on the policy information and network topology information, as described below.

Figure 1B:
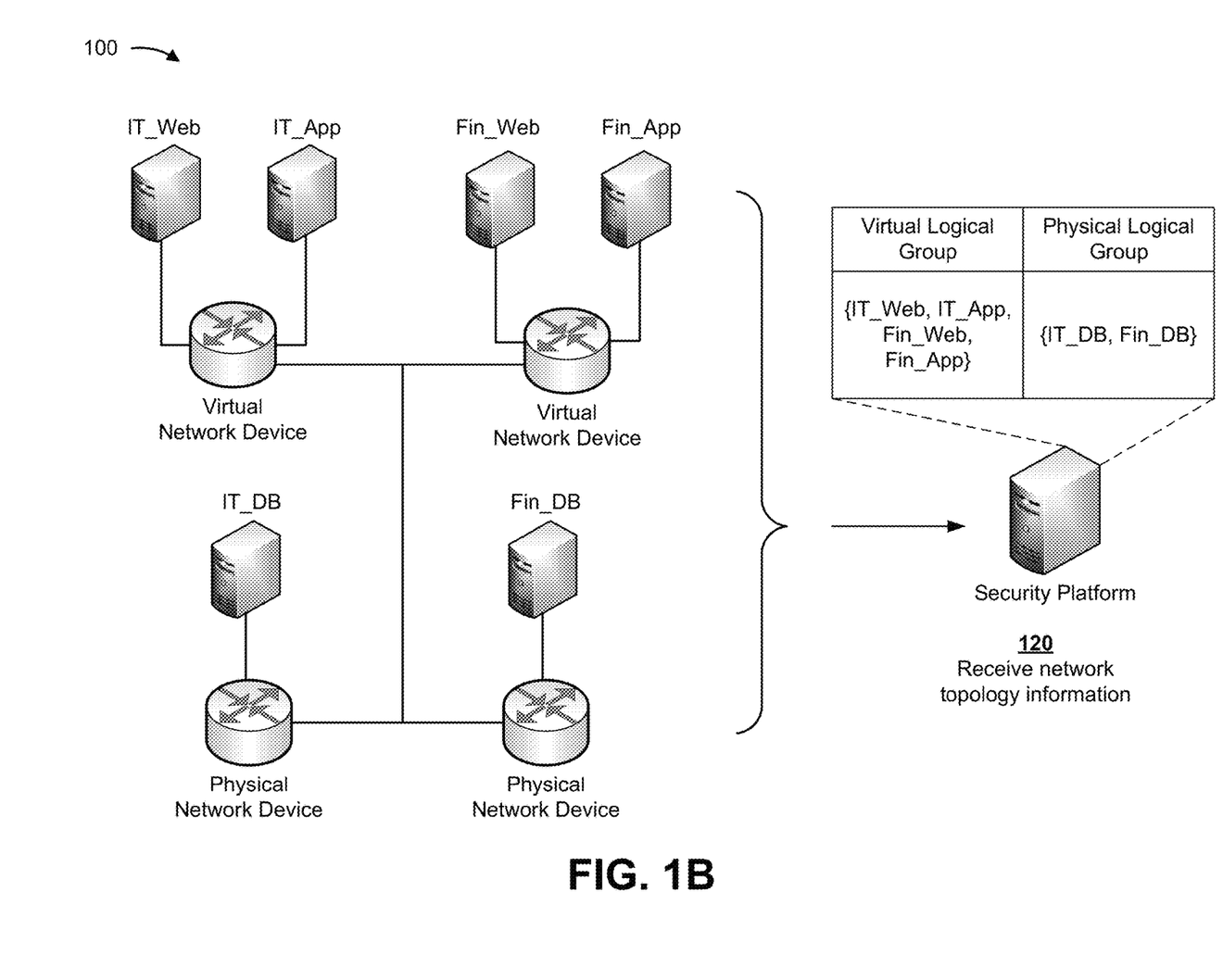

As shown in FIG. 1B, and by reference number 120, the security platform may receive network topology information. For example, the security platform may receive the network topology information from an element management system, a data center management system, a configuration file, and/or the like. The network topology information may include information that identifies devices (e.g., application components, network devices, etc.) in the data center, connections between the devices, locations of the devices, network addresses of the devices, and/or the like.

As shown, the web server and the application server of the IT application may be connected to a virtual network device (e.g., a virtual network device implemented by a hypervisor of a computer device). In this case, the web server and the application server of the IT application may be virtual application components (e.g., virtual machines). Similarly, the web server and the application server of the finance application may be virtual application components that are connected to a virtual network device. As further shown, the database server of the IT application and the database server of the finance application may be physical application components (e.g., applications running on bare-metal servers) that are connected to physical network devices.

As shown, the security platform may, using the network topology information, group the application components into logical groups. For example, a logical group may refer to a set of application components that are of a particular type (e.g., virtual or physical). As shown, the virtual logical group may include the web servers and the application servers of the IT application and finance application, respectively. Additionally, as shown, the physical logical group may include the database servers of the IT application and finance application, respectively. By grouping the application components into logical groups, the security platform may generate custom policies to provide to the virtual network devices and physical network devices, as described below.

Figure 1C:
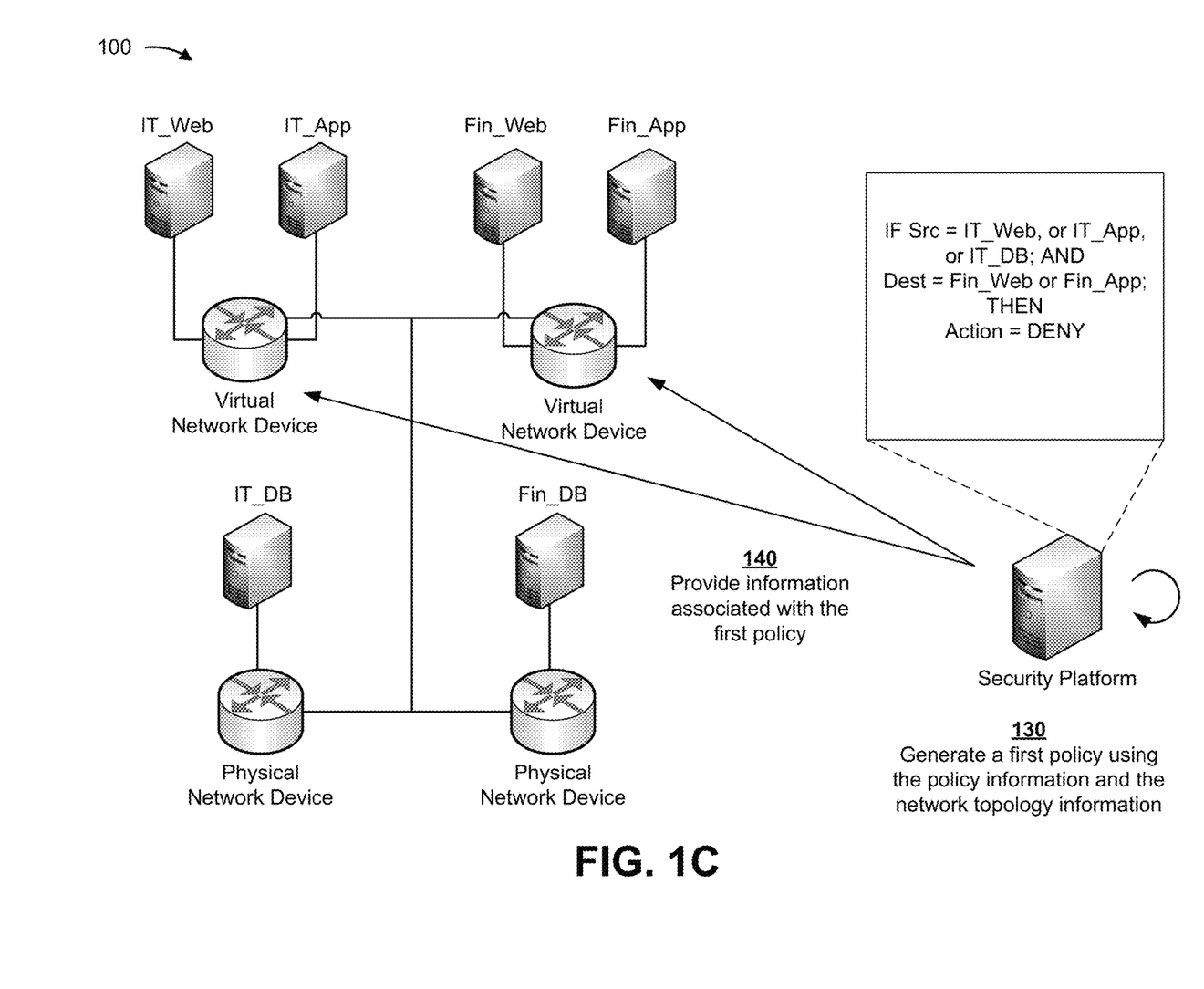

As shown in FIG. 1C, and by reference number 130, the security platform may generate a first policy using the policy information and the network topology information. For example, the first policy may include a set of rules that is to be implemented by a virtual network device in association with network traffic transferred between application components (e.g., between virtual application components, and/or between virtual application components and physical application components) of the IT application and finance application.

As shown, the first policy may include a rule that identifies that if the source of the network traffic is a web server associated with the IT application, an application server associated with the IT application, or a database server associated with the IT application, then the virtual network device is to deny the network traffic from being provided to a web server associated with the financial application and/or an application server associated with the finance application. The first policy may include a similar rule regarding network traffic provided by the IT application to the finance application. In other words, the security platform may generate a first set of policies that correspond to virtual application component to virtual application component network traffic, virtual application component to physical application component network traffic, and/or physical application component to virtual application component network traffic. While particular rules are shown, it should be understood that other implementations include other rules and/or other permutations of rules.

As shown by reference number 140, the security platform may provide information associated with the first policy to the virtual network device that is connected to the web server and the application server of the finance application (e.g., the virtual application components of the finance application). In this way, the virtual network device may implement rules associated with first policy in association with network traffic transferred between virtual application components of the finance application and the IT application, and/or between a virtual application component and a physical application component of the finance application and the IT application.

While not shown, the security platform may generate another policy and provide the other policy to the virtual network device that is connected to the web server and the application server of the IT application. In this way, the virtual network devices may implement rules that are consistent with the policy shown in FIG. 1A (e.g., that the finance application and IT application are prohibited from communicating). However, network traffic that is transferred between the database server of the IT application and the database server of the finance application might not traverse either virtual network device. Thereby, the security platform may generate a custom policy for physical network devices, as described below.

Figure 1D:
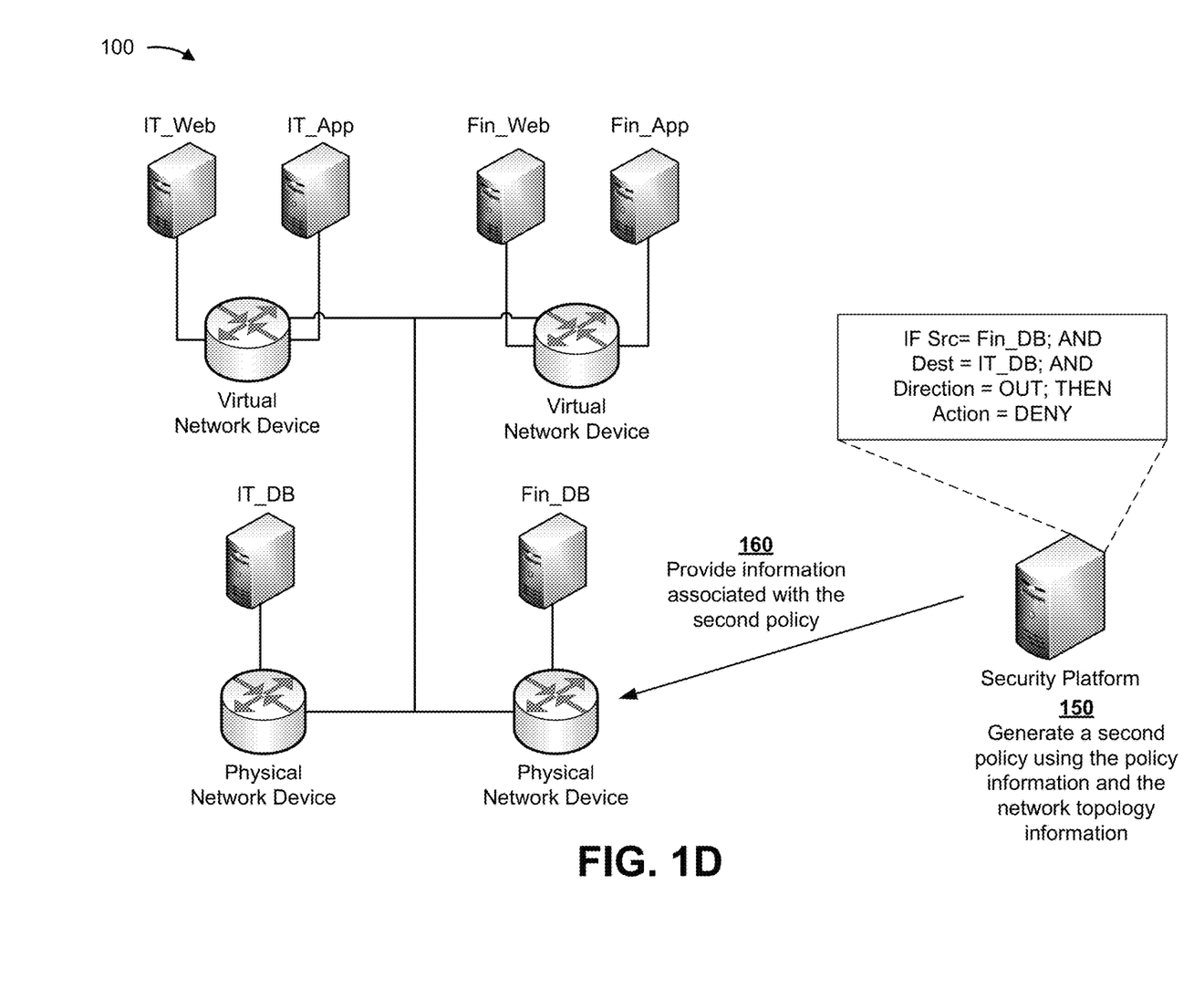

As shown in FIG. 1D, and by reference number 150, the security platform may generate a second policy using the policy information and the network topology information. For example, the second policy may include a set of rules that is to be implemented by a physical network device in association with network traffic transferred between physical application components of the IT application and finance application.

As shown, the second policy may include a rule that identifies that if the source of network traffic is associated with the database server of the financial application and the destination of the network traffic is associated with the database server of the IT application, then the physical network device is to deny the network traffic.

As further shown in FIG. 1D, and by reference number 160, the security platform may provide information associated with the second policy to a physical network device that is connected to the database server associated with the financial application. In this way, the physical network device may store information associated with a reduced number of rules as compared to a situation where the physical network device stores additional rules regarding network traffic transferred between virtual application components. In other words, the physical network device may store rules that are applicable to network traffic that might be transferred between physical application components of the IT application and the financial application.

While not shown, the security platform may generate another policy, and provide information associated with the other policy to the physical network device that is connected to the database server of the IT application. Thereby, each network device shown in FIG. 1D may implement respective policies that, in the aggregate, enforce the policy shown in FIG. 1A.

In this way, some implementations described herein provide a security platform that may receive policy information associated with a set of application groups, and generate custom policies for virtual network devices and physical network devices using the policy information. Additionally, the security platform may identify particular virtual network devices and/or physical network devices that are connected to application components of the set of application groups, and provide the custom policies to the particular network devices (e.g., instead of all network devices of a data center).

In this way, the security platform may generate the custom policies such that physical network devices may store rules regarding network traffic transferred between physical application components rather than storing rules regarding network traffic transferred between physical application components and virtual application components. Additionally, in this way, particular network devices may store rules that are applicable to application components that are connected to the particular network devices (e.g., without storing rules that might not be applicable).

In this way, some implementations described herein conserve network device processor and/or memory resources, and conserve network resources. Additionally, in this way, some implementations described herein permit micro-segmentation to be implemented in association with virtual and physical application components. Additionally, in this way, some implementations described herein permit enforcement of micro-segmentation policies without requiring extensive network re-engineering, re-direction of network traffic, and/or the like.

As indicated above, FIGS. 1A-1D are provided merely as an example. Other examples are possible and may differ from what was described with regard to FIGS. 1A-1D.

Figure 2:
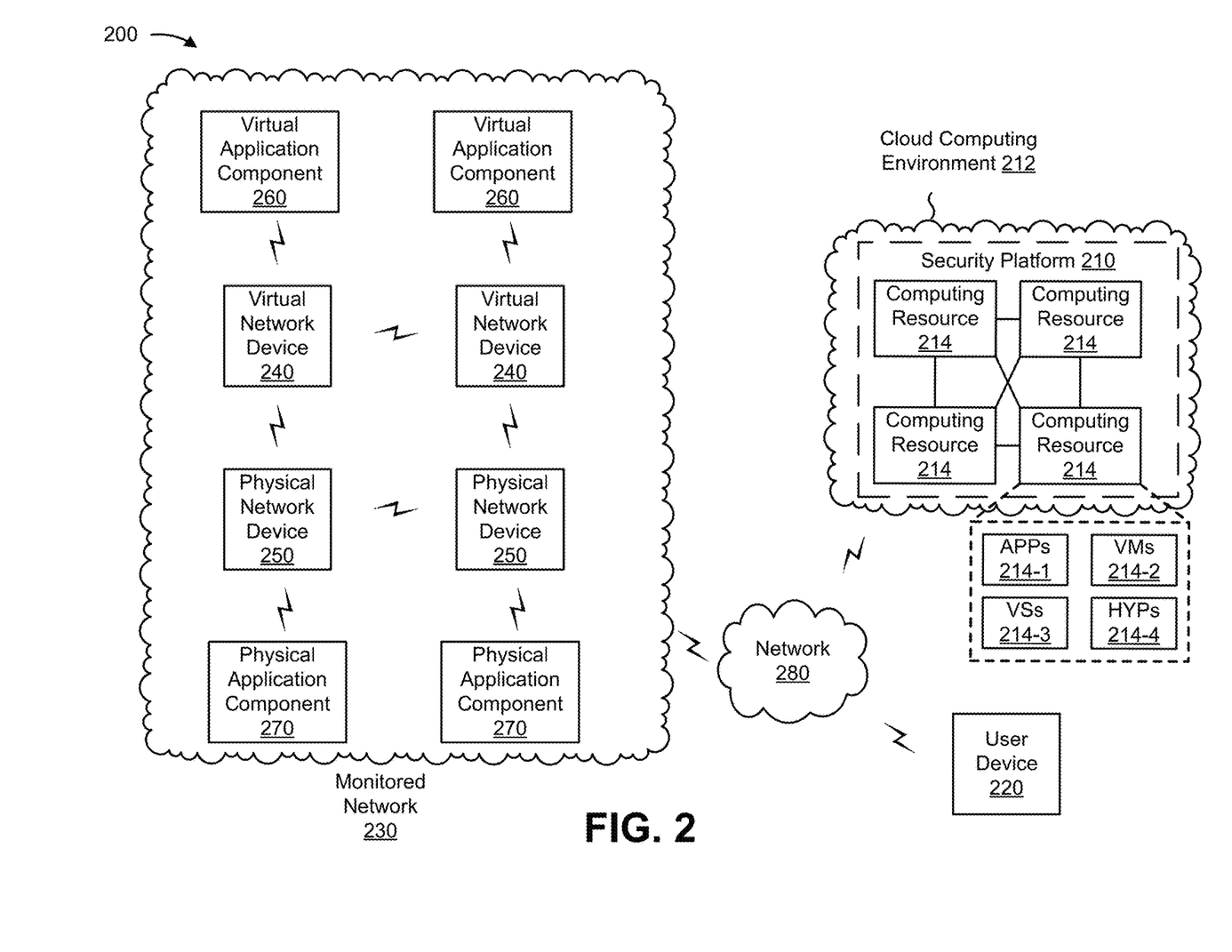
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a security platform 210, a user device 220, a monitored network 230, a set of virtual network devices 240

(referred to collectively as "virtual network devices 240" and individually as "virtual network device 240"), a set of physical network devices 250 (referred to collectively as "physical network devices 250" and individually as "physical network device 250"), a set of virtual application components 260 (referred to collectively as "virtual application components 260" and individually as "virtual application component 260"), a set physical application components 270 (referred to collectively as "physical application components 270" and individually as "physical application component 270"), and a network 280. Devices of environment 200 may interconnect via wired connections, wireless connections, or a combination of wired and wireless connections.

Security platform 210 includes one or more devices capable of generating policies using policy information and network topology information. In some implementations, security platform 210 may be designed to be modular such that certain software components may be swapped in or out depending on a particular need. As such, security platform 210 may be easily and/or quickly reconfigured for different uses.

In some implementations, as shown, security platform 210 may be hosted in cloud computing environment 212. Notably, while implementations described herein describe security platform 210 as being hosted in cloud computing environment 212, in some implementations, security platform 210 might not be cloud-based (i.e., may be implemented outside of a cloud computing environment) or may be partially cloud-based.

Cloud computing environment 212 includes an environment that hosts security platform 210. Cloud computing environment 212 may provide computation, software, data access, storage, etc. services that do not require end-user (e.g., user device 220) knowledge of a physical location and configuration of system(s) and/or device(s) that hosts security platform 210. As shown, cloud computing environment 212 may include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 may host security platform 210. The cloud resources may include compute instances executing in computing resource 214, storage devices provided in computing resource 214, data transfer devices provided by computing resource 214, etc. In some implementations, computing resource 214 may communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, or the like.

Application 214-1 includes one or more software applications that may be provided to or accessed by user device 220. Application 214-1 may eliminate a need to install and execute the software applications on user device 220. For example, application 214-1 may include software associated with security platform 210 and/or any other software capable of being provided via cloud computing environment 212. In some implementations, one application 214-1 may send/receive information to/from one or more other applications 214-1, via virtual machine 214-2.

Virtual machine 214-2 includes a software implementation of a machine (e.g., a computer) that executes programs like a physical machine. Virtual machine 214-2 may be either a system virtual machine or a process virtual machine, depending upon use and degree of correspondence to any real machine by virtual machine 214-2. A system virtual machine may provide a complete system platform that supports execution of a complete operating system ("OS"). A process virtual machine may execute a single program, and may support a single process. In some implementations, virtual machine 214-2 may execute on behalf of a user (e.g., user device 220), and may manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 214-4 may provide hardware virtualization techniques that allow multiple operating systems (e.g., "guest operating systems") to execute concurrently on a host computer, such as computing resource 214. Hypervisor 214-4 may present a virtual operating platform to the guest operating systems, and may manage the execution of the guest operating systems. Multiple instances of a variety of operating systems may share virtualized hardware resources.

User device 220 includes one or more devices capable of receiving, generating, storing, processing, and/or providing information associated with a policy. For example, user device 220 may include a device, such as a mobile phone (e.g., a smart phone, a radiotelephone, etc.), a laptop computer, a tablet computer, a handheld computer, or a similar type of device.

Monitored network 230 includes one or more wired and/or wireless networks. For example, monitored network 230 may include a local area network (LAN), a virtual LAN (VLAN), a virtual extensible LAN (VXLAN), a wide area network (WAN), a metropolitan area network (MAN), a data center, a private network, an ad hoc network, an intranet, the Internet, a fiber optic-based network, a cloud computing network, a branch network, an enterprise network, or the like, and/or a combination of these or other types of networks.

Virtual network device 240 includes one or more devices capable of processing and transferring network traffic. For example, virtual network device 240 may include a router, a gateway, a switch, a firewall, a hub, a bridge, a reverse proxy, a server, a security device, an intrusion detection device, a load balancer, or a similar type of device. In some implementations, virtual network device 240 may be a virtual device implemented by one or more computer devices of a cloud computing environment or a data center.

Physical network device 250 includes one or more devices capable of processing and transferring network traffic. For example, physical network device 250 may include a router, a gateway, a switch, a firewall, a hub, a bridge, a reverse proxy, a server, a security device, an intrusion detection device, a load balancer, a line card (e.g., in a chassis-based system), or a similar type of device. In some implementations, physical network device 250 may be a physical device implemented within a housing, such as a chassis.

Virtual application component 260 includes one or more devices capable of receiving, generating, storing, processing, and/or providing network traffic associated with an application. For example, virtual application component 260 may include a server device (e.g., a host server, a web server, an application server, a database server, etc.), a data center device, or a similar device. In some implementations, virtual application component 260 may be a virtual device implemented by one or more computer devices of a cloud computing environment or a data center.

Physical application component 270 includes one or more devices capable of receiving, generating, storing, processing, and/or providing network traffic associated with an application. For example, physical application component 270 may include a server device (e.g., a host server, a web server, an application server, a database server, etc.), a data center device, an endpoint device, a user device, or a similar device. In some implementations, physical application component 270 may be a physical device, such as a bare-metal server, a single-tenant physical server, and/or the like.

Network 280 includes one or more wired and/or wireless networks. For example, network 280 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an Ethernet virtual private network (EVPN), and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
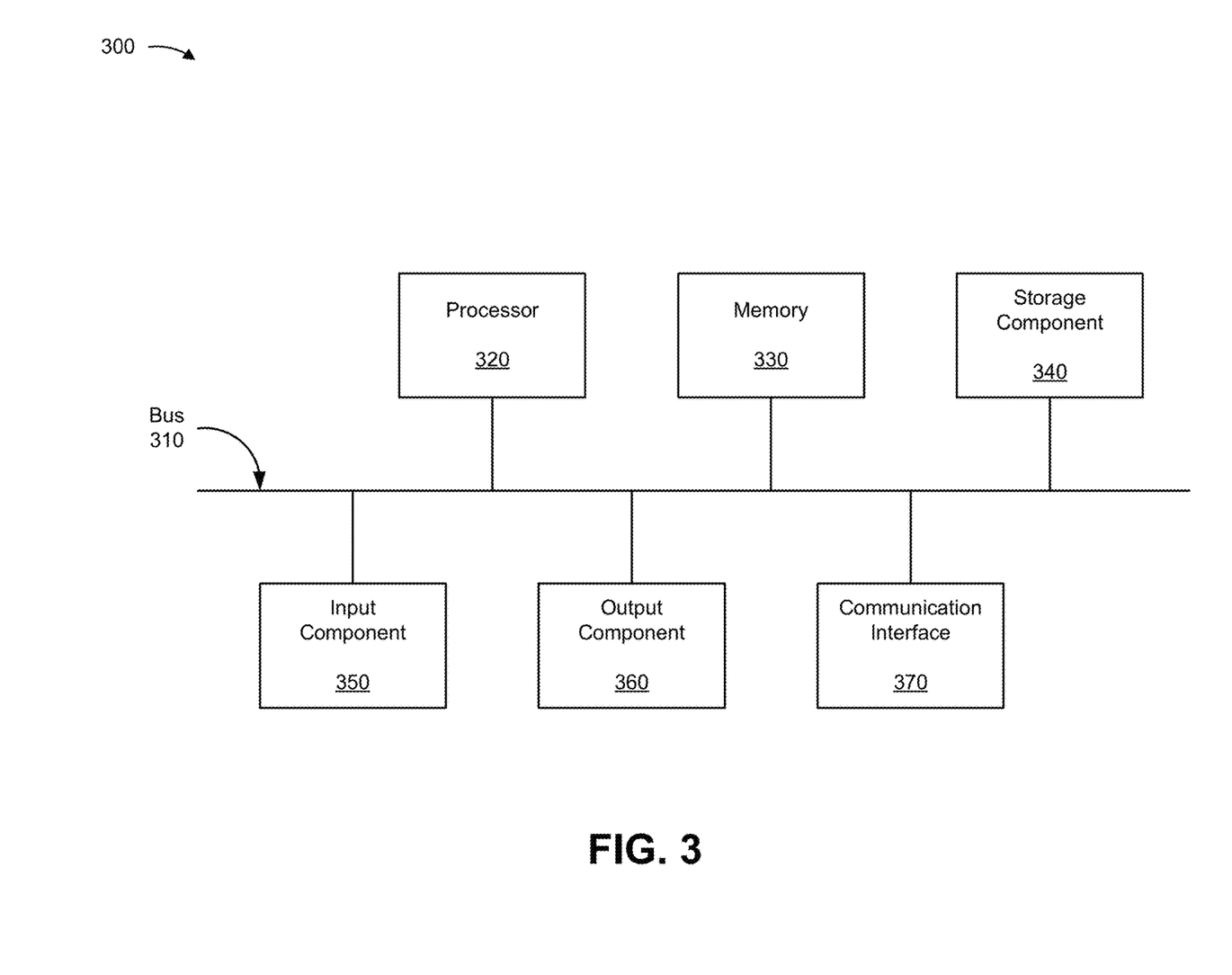
FIG. 3 is a diagram of example components of one or more devices of FIG. 2.

FIG. 3 is a diagram of example components of a device 300. Device 300 may correspond to security platform 210, user device 220, virtual network device 240, physical network device 250, virtual application component 260, and/or physical application component 270. In some implementations, security platform 210, user device 220, virtual network device 240, physical network device 250, virtual application component 260, and/or physical application component 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
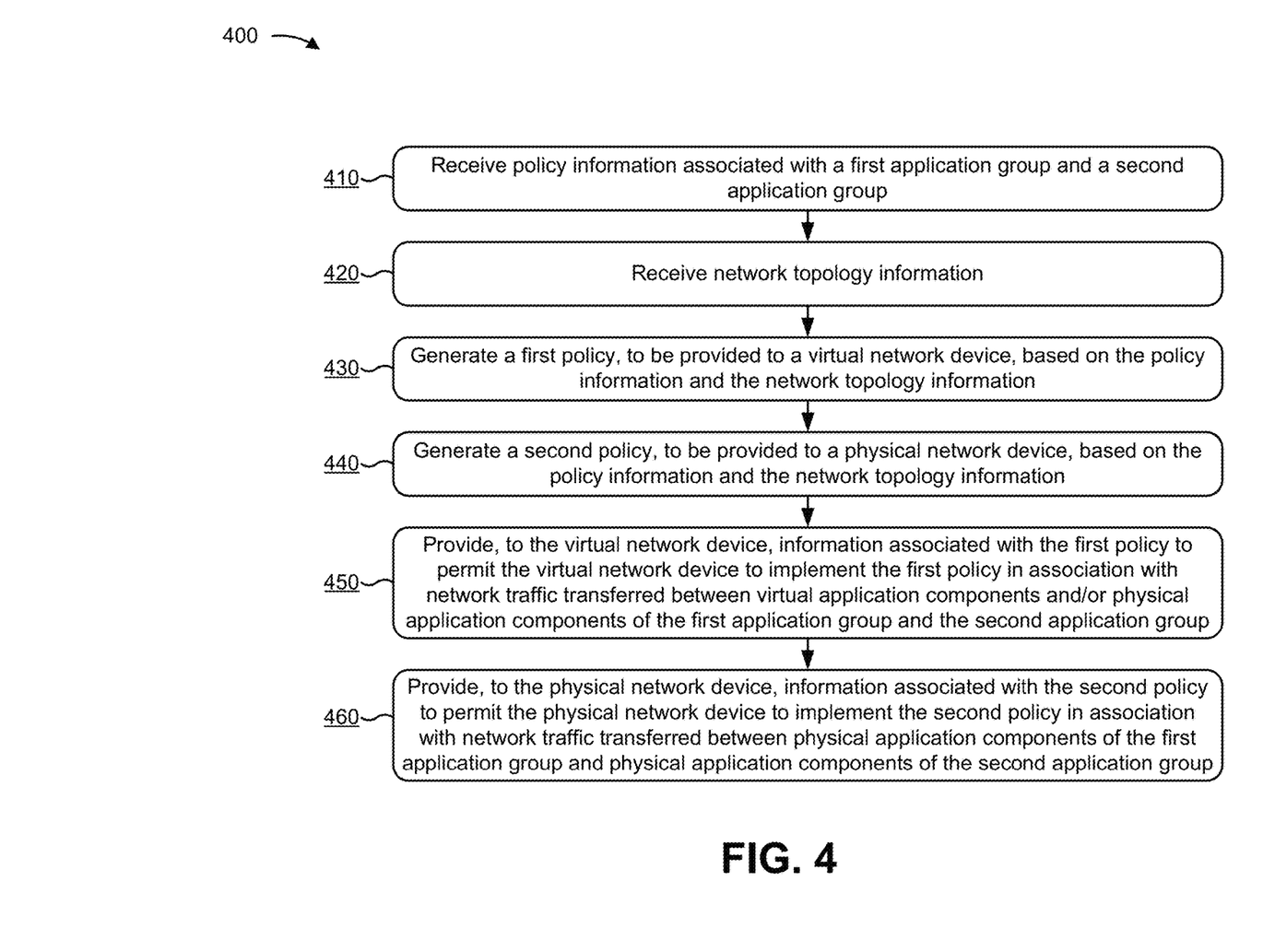
FIG. 4 is a flow chart of an example process for enforcing micro-segmentation policies for physical and virtual application components.

FIG. 4 is a flow chart of an example process 400 for enforcing micro-segmentation policies for physical and virtual application components. In some implementations, one or more process blocks of FIG. 4 may be performed by security platform 210. In some implementations, one or more process blocks of FIG. 4 may be performed by another device or a group of devices separate from or including security platform 210, such as user device 220, virtual network device 240, physical network device 250, virtual application component 260, and/or physical application component 270.

As shown in FIG. 4, process 400 may include receiving policy information associated with a first application group and a second application group (block 410). For example, security platform 210 may receive, from user device 220, policy information that identifies a policy to be implemented in association with network traffic that might be transferred between a first application group and a second application group.

In some implementations, policy information may refer to a set of rules that is to be applied to network traffic transferred between application components (e.g., virtual application components 260 and/or physical application components 270) of application groups. For example, a rule may identify an action that is to be performed in association with network traffic, such as permit, filter, deny, log, quarantine, redirect, rate limit, prioritize, and/or the like. In some implementations, the set of rules may be implemented by a firewall, an access control device, an intrusion prevention system, and/or the like.

In some implementations, an application group may refer to a set of application components that provides application functionality. For example, an n-tier (e.g., where n≥1) application architecture may include n application components that provide a functionality associated with an application. As a particular example, a web application may include a three-tier application architecture whereby a first type of application component (e.g., a web-server), a second type of application component (e.g., an application server), and a third type of application component (e.g., a database server) communicate to perform a functionality. In some implementations, different types of application components and/or different application components of a same type may be virtual application components 260 or physical application components 270.

In some implementations, monitored network 230 may include application components of the first application group and application components of the second application group. Alternatively, application components of the first application group may be associated with different monitored networks 230, and application components of the second application group may be associated with different monitored networks 230. Alternatively, application components of the first application group may be associated with a different monitored network 230 than as compared to application components of the second application group.

In some implementations, the policy information may identify the first application group and the second application group. For example, the policy information may include a set of application group identifiers, and/or the like. Additionally, or alternatively, the policy information may identify and/or be used to identify application components of the first application group and the second application group. For example, the policy information may include and/or identify network addresses (e.g., Internet protocol (IP) addresses, media access control (MAC) addresses, port identifiers, and/or the like), device identifiers, application component identifiers, network traffic signatures, and/or the like.

In some implementations, the policy information may identify a set of rules to be performed in association with network traffic transferred between application components of the first application group and the second application group. For example, user device 220 (e.g., which may have received an input from a network operator) may provide the policy information to security platform 210 to permit security platform 210 to generate policies that are to be applied by virtual network devices 240 and/or physical network devices 250 of monitored network 230. In some implementations, security platform 210 may receive the policy information based on an input from user device 220, based on a time frame, based on receiving a configuration file, based on being connected to monitored network 230, based on being powered-on, and/or the like.

In this way, security platform 210 may receive the policy information, and generate custom policies for virtual network devices 240 and/or physical network devices 250 using the policy information, as described elsewhere herein.

As further shown in FIG. 4, process 400 may include receiving network topology information (block 420). For example, security platform 210 may receive network topology information associated with monitored network 230, a set of monitored networks 230, and/or the like.

In some implementations, security platform 210 may receive the network topology information based on being placed in communication with monitored network 230, based on being powered-on, based on being activated to provide security services for monitored network 230, based on a configuration, based on a set of files received from user device 220, and/or the like.

In some implementations, security platform 210 may receive the network topology information from an element management system (EMS) of monitored network 230 that has access to the network topology. Additionally, or alternatively, security platform 210 may receive or retrieve the network topology information using a network access control (NAC) protocol. For example, security platform 210 may implement the NAC protocol to receive the network topology information after being connected to monitored network 230.

In some implementations, the network topology information may include a set of data, a set of files, a set of messages, a set of images, and/or the like, including information associated with a network (e.g., monitored network 230) and the devices in the network (e.g., virtual network devices 240, physical network devices 250, virtual application components 260, and/or physical application components 270).

In some implementations, the network topology information may include information that identifies the devices in monitored network 230, communication links between devices in monitored network 230 (e.g., indicating neighbor relationships between devices), physical locations of devices in monitored network 230 (e.g., geographical location, site location, rack and/chassis location, and/or the like), port and/or socket information of communication links between devices of monitored network 230, paths associated with monitored network 230, and/or the like.

In some implementations, the network topology information may include information that identifies a number of devices in monitored network 230, types of devices in monitored network 230 (e.g., types of network devices, types of application components, and/or the like), communication protocols of devices in monitored network 230, capabilities of the devices (e.g., security capabilities of the devices, services provided by the devices, and/or the like), resource utilization of devices in monitored network 230, policies that are currently deployed to devices in monitored network 230, whether a device is virtual or physical, whether a device belongs to an application group, connectivity to an external network, and/or the like.

In some implementations, security platform 210 may use the network topology information to identify virtual application components 260 and/or physical application components 270 of the first application group and/or the second application group in monitored network 230. Additionally, or alternatively, security platform 210 may use the network topology information to identify virtual network devices 240 and/or physical network devices 250 in monitored network 230. In this way, security platform 210 may generate custom policies for virtual network devices 240 and/or physical network devices 250 using the policy information and the network topology information, as described below.

As further shown in FIG. 4, process 400 may include generating a first policy, to be provided to a virtual network device, based on the policy information and the network topology information (block 430). For example, security platform 210 may generate a first policy, to be provided to a set of virtual network devices 240, that permits the set of virtual network devices 240 to implement the first policy in association with network traffic transferred between the first application group and the second application group.

In some implementations, the first policy may refer to a set of rules, that is to be provided to a virtual network device 240, that permits the virtual network device 240 to implement the first policy in association with network traffic transferred between virtual application components 260, and/or between virtual application components 260 and physical application components 270 of the first application group and the second application group.

For example, the first policy may include a rule that is to be implemented in association with network traffic transferred between a virtual application component 260 of the first application group and a virtual application component 260 of the second application group. Additionally, or alternatively, the first policy may include a rule that is to be implemented in association with network traffic transferred between a virtual application component 260 (e.g., of either the first application group or the second application group) and a physical application component 270 (e.g., of either the first application group or the second application group). In other words, the first policy may include a rule that is to be applied to network traffic that includes at least a virtual application component 260 as a source or destination of the network traffic.

In some implementations, security platform 210 may use the policy information, that was received in association with block 410, to identify that the first policy is to be applied to the first application group and the second application group. In some implementations, security platform 210 may identify a set of application components (e.g., virtual application components 260 and/or physical application components 270) of the first application group, and a set of application components of the second application group after identifying that the first policy is to be applied to the first application group and the second application group.

In some implementations, security platform 210 may identify, using the network topology information, a set of logical groups associated with the first application group and the second application group. In some implementations, a logical group may include a set of application components that are of the same type (e.g., either virtual or physical). For example, security platform 210 may identify a set of virtual application components 260 of the first application group and/or the second application group, and group the set of virtual application components 260 into a virtual logical group. Additionally, or alternatively, security platform may identify a set of physical application components 270 of the first application group and/or the second application group, and group the set of physical application components 270 into a physical logical group.

In other words, the virtual logical group may include and/or identify all of the virtual application components 260 of the first application group and all of the virtual application components 260 of the second application group. Additionally, the physical logical group may include and/or identify all of the physical application components 270 of the first application group and all of the physical application components 270 of the second application group.

In some implementations, security platform 210 may generate the first policy to include a set of rules that is to be implemented in association with network traffic that is transferred between application components of the virtual logical group (e.g., virtual application component 260 to virtual application component 260), and between application components of the virtual logical group and the physical logical group (e.g., virtual application component 260 to physical application component 270, and vice versa).

In this way, and as described elsewhere herein, security platform 210 may provide information associated with the first policy to particular virtual network devices 240 to permit the particular virtual network devices 240 to implement the first policy.

As further shown in FIG. 4, process 400 may include generating a second policy, to be provided to a physical network device, based on the policy information and the network topology information (block 440). For example, security platform 210 may generate a second policy, to be provided to a set of physical network devices 250, that permits the set of physical network devices 250 to implement the second policy in association with network traffic transferred between the first application group and the second application group.

In some implementations, the second policy may refer to a set of rules, that is to be provided to a physical network device 250, that permits the physical network device 250 to implement the second policy in association with network traffic transferred between physical application components 270 of the first application group and physical application components 270 of the second application group.

In some implementations, security platform 210 may generate the second policy to include a set of rules that is to be implemented in association with network traffic that is transferred between application components of the physical logical group. In some implementations, the second policy may not include a set of rules to be implemented in association with network traffic associated with the virtual logical group. In this way, security platform 210 may reduce a number of rules that are provided to physical network devices 250, thereby permitting physical network devices 250 to store a subset of rules. In this way, some implementations described herein conserve processor and/or memory resources of physical network devices 250 and/or conserve network resources.

In this way, and as described elsewhere herein, security platform 210 may provide information associated with the second policy to particular physical network devices 250 to permit the particular physical network devices 250 to implement the second policy.

As further shown in FIG. 4, process 400 may include providing, to the virtual network device, information associated with the first policy to permit the virtual network device to implement the first policy in association with network traffic transferred between virtual application components and/or physical components of the first application group and the second application group (block 450). For example, security platform 210 may provide information associated with the first policy to a set of virtual network devices 240 to which application components of the virtual logical group are connected.

In some implementations, security platform 210 may, using the network topology information, identify a set of virtual network devices 240 to which to provide information associated with the first policy. For example, security platform 210 may identify a virtual network device 240 that is connected to a virtual application component 260 of the virtual logical group, and may provide information associated with the first policy to the virtual network device 240.

In some implementations, security platform 210 may provide information associated with the first policy to each virtual network device 240 that is connected to at least one virtual application component 260 of the virtual logical group. Alternatively, security platform 210 may provide information associated with the first policy to a subset of virtual network devices 240, while still permitting rules associated with the first policy to be implemented in association with network traffic transferred between the virtual logical group of the first application group and the second application group and/or the virtual logical group and physical logical group of the first application group and the second application group, as described below.

In some implementations, security platform 210 may use the network topology information to identify particular virtual network devices 240 to which to provide the information associated with the first policy, such that all potential network traffic that might be transferred between the first application group and the second application group, in association with the virtual logical group, will be processed by at least one of the particular virtual network devices 240. In this way, some implementations described herein improve resource utilization associated with data centers and/or conserve cloud computing environment resources by reducing a number of virtual network devices 240 that are to store the first policy information.

In some implementations, security platform 210 may provide the first policy information based on generating the first policy information, based on a time frame (e.g., periodically), based on virtual network devices 240 being created, based on virtual network devices 240 connecting to monitored network 230, and/or the like.

In some implementations, security platform 210 may provide, to virtual network device 240, an instruction to remove information associated with the first policy. For example, security platform 210 may receive information that identifies that a virtual application component 260 is no longer connected to a particular virtual network device 240, and may provide an instruction to the particular virtual network device 240 to remove stored information associated with the first policy.

In some implementations, security platform 210 may determine, using network topology information, that application components of the first application group and application components of the second application group are associated with different monitored networks 230. Additionally, security platform 210 may provide, to a set of virtual network devices 240, an instruction to remove the first policy information based on determining that the application components are associated with different monitored networks 230. Additionally, security platform 210 may provide, to another network device (e.g., associated with a perimeter, or a demilitarized zone (DMZ), of monitored network 230), information that permits the other network device to implement a policy that is based on the policy information that was received in association with block 410.

In this way, some implementations described herein improve data center resource utilization by reducing a number of network devices that are storing policy information. Additionally, in this way, rules associated with the policy information may still be applied to network traffic transferred between the first application group and the second application group because the network traffic may traverse the network device that is associated with the perimeter or DMZ of monitored network 230.

In some implementations, security platform 210 may provide, to a particular virtual network device 240, a policy that is customized to the particular virtual network device 240. For example, security platform 210 may, using the network topology information, identify a set of virtual application components 260 that is connected to the particular virtual network device 240. Additionally, security platform 210 may, using the policy information, generate a set of rules that is customized to the set of virtual application components 260 that is connected to the particular virtual network device 240. In this way, a virtual network device 240 may store a reduced amount of information than as compared to situations where the virtual network device 240 stores information associated with an entire set of rules (e.g., applicable to virtual application components 260 that are not connected to the virtual network device 240). In this way, some implementations described herein conserve processor and/or memory resources of virtual network devices 240.

In some implementations, the set of virtual network devices 240 may receive the information associated with the first policy, and may implement rules associated with the first policy in association with network traffic transferred between the first application group and the second application group. In this way, micro-segmentation can be implemented by virtual network devices 240.

As further shown in FIG. 4, process 400 may include providing, to the physical network device, information associated with the second policy to permit the physical network device to implement the second policy in association with network traffic transferred between physical application components of the first application group and physical components of the second application group (block 460). For example, security platform 210 may provide information associated with the second policy to a set of physical network devices 250 to which application components of the physical logical group are connected.

In some implementations, security platform 210 may identify, using the network topology information, a set of physical network devices 250 to which to provide information associated with the second policy. For example, security platform 210 may identify a physical network device 250 that is connected to a physical application component 270 of the physical logical group, and may provide the information associated with the second policy to the physical network device 250.

In some implementations, security platform 210 may provide information associated with the second policy to each physical network device 250 that is connected to at least one physical application component 270 of the physical logical group. Alternatively, and in a similar manner as described above in connection with block 450, security platform 210 may provide information associated with the second policy to a subset of physical network devices 250 while still permitting the policy to be enforced.

In some implementations, and in a similar manner as described above in connection with block 450, security platform 210 may generate a custom policy for a particular physical network device 250 (e.g., based on a particular set of physical application components 270 that is connected to the particular physical network device 250).

In some implementations, physical network device 250 may receive the information associated with the second policy, and may store the information to permit rules associated with the second policy to be implemented in association with network traffic that is transferred between application components of the physical logical group. For example, physical network device 250 may store an access control list entry that identifies rules to be applied to application components of the physical logical group.

By storing information associated with the second policy (e.g., that is associated with the physical logical group and not the virtual logical group), physical network device 250 may conserve processor and/or memory resources. In this way, some implementations described herein improve data center resource utilization, and prevent communication issues (e.g., reduced throughput, packet loss, high latency, etc.) by reducing an amount of information that is stored by physical network devices 250.

In this way, some implementations described herein permit security platform 210 to generate, based on policy information, custom policies and provide the custom policies to virtual network devices 240 and physical network devices 250. The virtual network devices 240 and physical network devices 250 may implement the custom policies to implement micro-segmentation in a data center.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a security platform that permits micro-segmentation to be implemented in a data center and in association with virtual application component communication and physical application component communication. Some implementations described herein improve data center security, improve data center resource utilization, conserve network resources, conserve network device processor and/or memory resources, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive policy information associated with a first application group and a second application group,
the first application group including a first set of virtual application components and a first set of physical application components,
the second application group including a second set of virtual application components and a second set of physical application components;

generate a logical group of virtual application components,
the first set of virtual application components and the second set of virtual application components being included in the logical group of virtual application components based on the first set of virtual application components and the second set of virtual application components being virtual application components;
generate a logical group of physical application components,
the first set of physical application components and the second set of physical application components being included in the logical group of physical application components based on the first set of physical application components and the second set of physical application components being physical application components;
receive network topology information associated with a network;
generate a first policy, to be provided to a virtual network device of the network, based on the policy information, the logical group of virtual application components, and the network topology information,
a virtual application component, of the first set of virtual application components, being connected to the virtual network device;
generate a second policy, to be provided to a physical network device of the network, based on the policy information, the logical group of physical application components, and the network topology information,
a physical application component, of the first set of physical application components, being connected to the physical network device;
provide, to the virtual network device of the network, information associated with the first policy to permit the virtual network device to implement the first policy in association with network traffic transferred between the virtual application component, of the first set of virtual application components, and the second set of virtual application components,
the first policy being provided to the virtual network device based on the virtual network device being a virtual device type; and
provide, to the physical network device, information associated with the second policy to permit the physical network device to implement the second policy in association with network traffic transferred between the physical application component, of the first set of physical application components, and another physical application component of the second set of physical application components,
the second policy being provided to the physical network device based on the physical network device being a physical device type.

2. The device of claim 1, where the one or more processors are further to:
determine, using the network topology information, that the virtual application component is connected to the virtual network device; and
where the one or more processors, when providing the information associated with the first policy, are to:
provide the information associated with the first policy based on determining that the virtual application component is connected to the virtual network device.

3. The device of claim 1, where the one or more processors are further to:
determine, using the network topology information, that the physical application component is connected to the physical network device; and
where the one or more processors, when providing the information associated with the second policy, are to:
provide the information associated with the second policy based on determining that the physical application component is connected to the physical network device.

4. The device of claim 1, where the one or more processors are further to:
determine, using the network topology information, that the virtual application component is a virtual device; and
where the one or more processors, when generating the first policy, are to:
generate the first policy based on determining that the virtual application component is the virtual device.

5. The device of claim 1, where the one or more processors are further to:
determine that the virtual application component is not connected to the virtual network device; and
provide, to the virtual network device, an instruction to remove the information associated with the first policy.

6. The device of claim 1, where the physical network device is associated with a data center; and
where the network topology information includes information that identifies one or more of:
the physical network device,
connections between the physical network device and one or more other physical network devices in the data center,
locations of the physical network device and one or more other physical network devices in the data center, or
network addresses of the physical network device and one or more other physical network devices in the data center.

7. The device of claim 1, where the network topology information includes information that identifies one or more of:
a set of data associated with the virtual network device,
a set of files associated with the virtual network device, or
a set of messages associated with the virtual network device.

8. A non-transitory computer-readable medium storing instructions, the instructions comprising:
one or more instructions that, when executed by one or more processors, cause the one or more processors to:
receive policy information associated with a first application group and a second application group;
generate a logical group of virtual application components,
a set of virtual application components being included in the logical group of virtual application components based on the set of virtual application components being virtual application components;
generate a logical group of physical application components,
a set of physical application components being included in the logical group of physical application components based on the set of physical application components being physical application components;

receive network topology information associated with a network;

generate a first policy, to be provided to a virtual network device of the network, based on the policy information, the logical group of virtual application components, and the network topology information;

generate a second policy, to be provided to a physical network device of the network, based on the policy information, the logical group of physical application components, and the network topology information, the first policy being different than the second policy;

provide, to the virtual network device, information associated with the first policy to permit the virtual network device to implement the first policy in association with network traffic transferred between the first application group and the second application group, the first policy being provided to the virtual network device based on the virtual network device being a virtual device type; and provide, to the physical network device, information associated with the second policy to permit the physical network device to implement the second policy in association with network traffic transferred between the first application group and the second application group, the second policy being provided to the physical network device based on the physical network device being a physical device type.

9. The non-transitory computer-readable medium of claim 8, where the one or more instructions, when executed by the one or more processors, further cause the one or more processors to:

determine, using the network topology information, that a virtual application component of the first application group is connected to the virtual network device; and where the one or more instructions, that cause the one or more processors to provide the information associated with the first policy, cause the one or more processors to:

provide the information associated with the first policy based on determining that the virtual application component is connected to the virtual network device.

10. The non-transitory computer-readable medium of claim 8, where the one or more instructions, when executed by the one or more processors, further cause the one or more processors to:

determine, using the network topology information, that a physical application component of the first application group is connected to the physical network device; and where the one or more instructions, that cause the one or more processors to provide the information associated with the second policy, cause the one or more processors to:

provide the information associated with the second policy based on determining that the physical application component of the first application group is connected to the physical network device.

11. The non-transitory computer-readable medium of claim 8, where the second policy includes a set of rules to be implemented in association with network traffic transferred between a first set of physical application components of the first application group and a second set of physical application components of the second application group.

12. The non-transitory computer-readable medium of claim 8, where the one or more instructions, that cause the one or more processors to generate the first policy, cause the one or more processors to:

generate the first policy after generating the logical group of virtual application components and the logical group of physical application components, the first policy including a set of rules associated with the logical group of virtual application components and the logical group of physical application components.

13. The non-transitory computer-readable medium of claim 8, where the one or more instructions, that cause the one or more processors to generate the second policy, cause the one or more processors to:

generate the second policy after generating the logical group of virtual application components and the logical group of physical application components, the second policy including a first set of rules associated with the logical group of the physical application components, and the second policy not including a second set of rules associated with the logical group of the virtual application components.

14. The non-transitory computer-readable medium of claim 8, where the virtual network device is associated with a cloud platform, and the physical network device is associated with a data center.

15. A method, comprising:

receiving, by a device, policy information associated with a set of application groups;

generating, by the device, a logical group of virtual application components, a set of virtual application components being included in the logical group of virtual application components based on the set of virtual application components being virtual application components;

generating, by the device, a logical group of physical application components, a set of physical application components being included in the logical group of physical application components based on the set of physical application components being physical application components;

receiving, by the device, network topology information associated with a network;

generating, by the device, a first policy, to be provided to a set of virtual network devices of the network, based on the policy information, the logical group of virtual application components, and the network topology information;

generating, by the device, a second policy, to be provided to a set of physical network devices of the network, based on the policy information, the logical group of physical application components, and the network topology information;

providing, by the device and to a virtual network device of the set of virtual network devices, information associated with the first policy to permit the virtual network device to implement the first policy in association with network traffic transferred between the set of application groups, the first policy being provided to the virtual network device based on the virtual network device being a virtual device type; and providing, by the device and to a physical network device of the set of physical network devices, information associated with the second policy to permit the physical network device to implement the second policy in association with network traffic transferred between the set of application groups,
> the second policy being provided to the physical network device based on the physical network device being a physical device type,
> the second policy including a set of rules associated with a set of physical application components of the set of application groups, and
> the second policy not including another set of rules associated with a set of virtual application components of the set of application groups.

16. The method of claim 15, further comprising:
determining that a virtual application component, of the set of virtual application components, is connected to the virtual network device; and
where providing the information associated with the first policy comprises:
> providing the information associated with the first policy based on determining that the virtual application component is connected to the virtual network device.

17. The method of claim 15, further comprising:
determining that a physical application component, of the set of physical application components, is connected to the physical network device; and
where providing the information associated with the second policy comprises:
> providing the information associated with the second policy based on determining that the physical application component is connected to the physical network device.

18. The method of claim 15, where the first policy includes a first set of rules, and where the second policy includes a subset of the first set of rules.

19. The method of claim 15, where the first policy includes the set of rules associated with the set of virtual application components of the set of application groups.

20. The method of claim 15, where the physical network device is associated with a data center;
where the network topology information includes information that identifies one or more of:
> the physical network device,
> connections between the physical network device and one or more other physical network devices in the data center,
> locations of the physical network device and one or more other physical network devices in the data center, or
> network addresses of the physical network device and one or more other physical network devices in the data center; and where the network topology information includes information that identifies one or more of:
a set of data associated with the virtual network device,
a set of files associated with the virtual network device, or
a set of messages associated with the virtual network device.

* * * * *